J. L. HOFER.
STEERING GEAR.
APPLICATION FILED MAY 23, 1919.

1,327,616.

Patented Jan. 13, 1920.
2 SHEETS—SHEET 1.

Inventor.
J. L. Hofer.

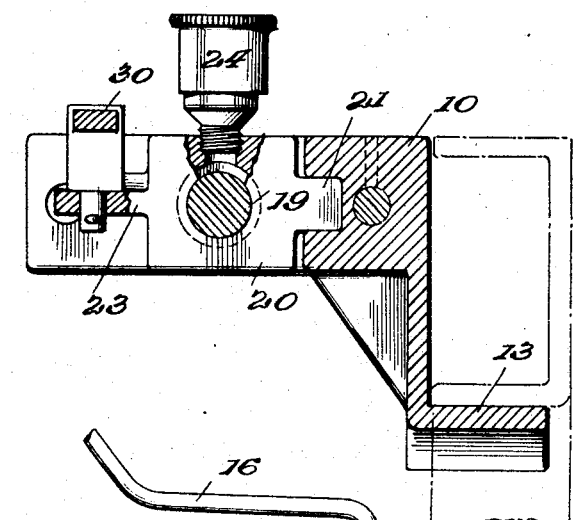
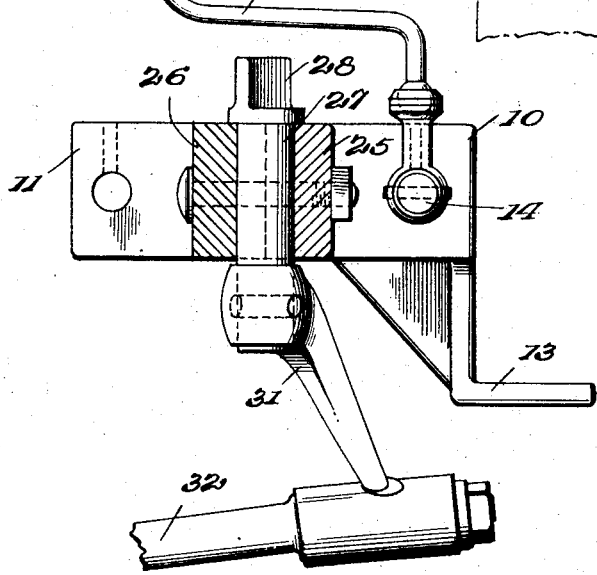
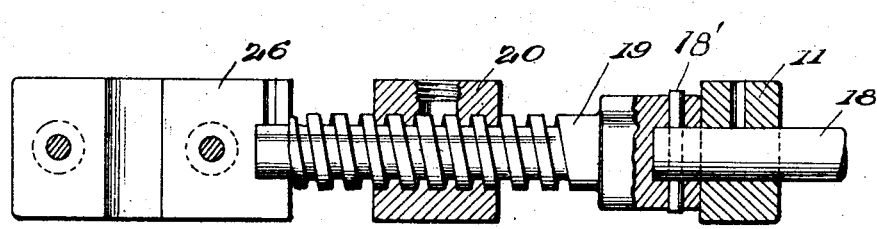

UNITED STATES PATENT OFFICE.

JOSEPH L. HOFER, OF BRIDGEWATER, SOUTH DAKOTA.

STEERING-GEAR.

1,327,616.   Specification of Letters Patent.   Patented Jan. 13, 1920.

Application filed May 23, 1919. Serial No. 299,111.

*To all whom it may concern:*

Be it known that I, JOSEPH L. HOFER, a citizen of the United States, residing at Bridgewater, in the county of McCook and State of South Dakota, have invented certain new and useful Improvements in Steering-Gears, of which the following is a specification.

This invention relates to an improved steering gear for motor vehicles and is particularly designed for use upon vehicles of the Ford type, the invention having as one of its principal objects to provide a steering gear which will be more steady than the steering gear now employed upon vehicles of this type, so that the present harmful side movement or wabbling of the front wheels of the vehicle will be eliminated.

The invention has as a further object in this connection to provide a steering gear which, while being adapted to resist side turning of the front wheels of the vehicle will, nevertheless, readily respond to turning movement of the steering post.

And the invention has as a still further object to provide a steering gear which may be readily installed upon the Ford type of vehicle without material structural change therein.

Figure 2:
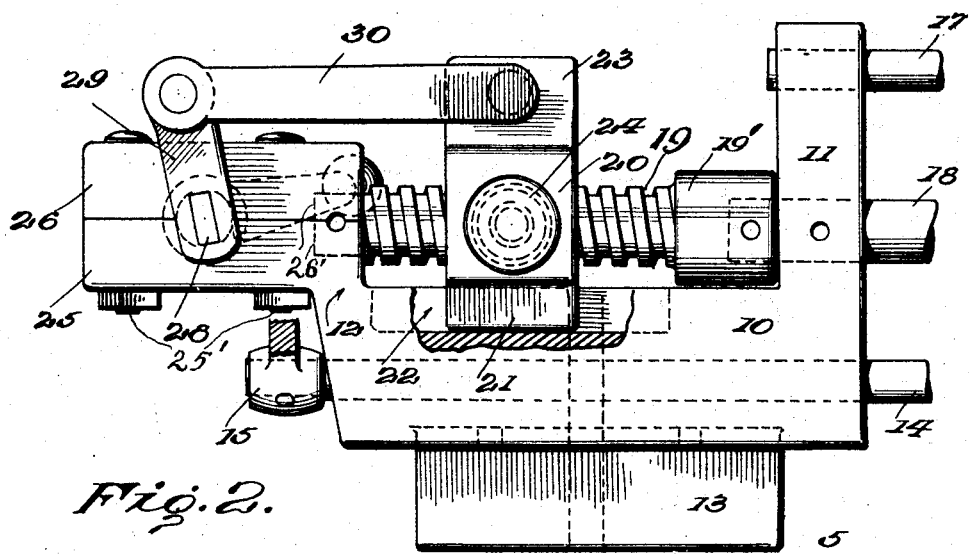
Figure 1:
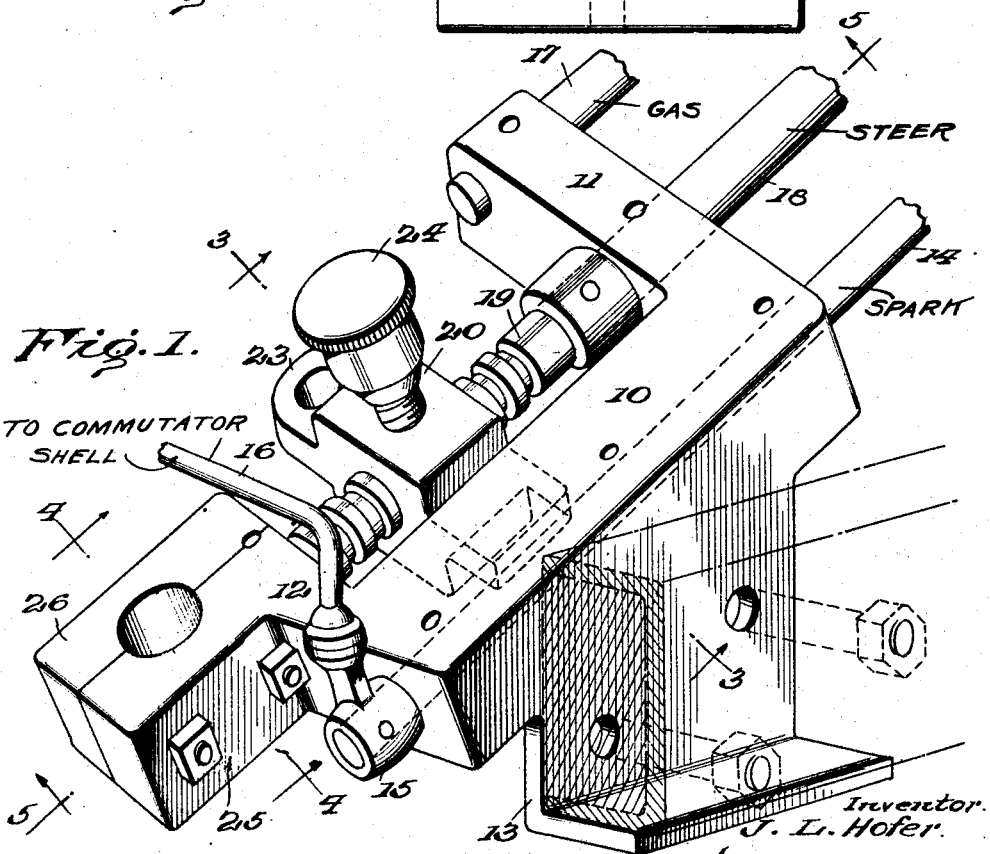

Other and incidental objects will appear hereinafter. In the accompanying drawings:

Figure 1 is a perspective view of my improved steering gear, parts being detached, Fig. 2 is a plan view, parts being broken away and shown in section, Fig. 3 is a transverse sectional view taken on the line 3—3 of Fig. 1 and looking in the direction of the arrows, Fig. 4 is a transverse sectional view taken on the line 4—4 of Fig. 1 and looking in the direction of the arrows, and Fig. 5 is a longitudinal sectional view taken on the line 5—5 of Fig. 1 and looking in the direction of the arrows.

In carrying the invention into effect, I employ a substantially U-shaped bearing bracket or block 10 having spaced lateral arms which, for convenience, have been indicated at 11 and 12 respectively. Depending from the connecting portion between these arms or the block body, is an angle plate 13 adapted to engage beneath one side frame member of a vehicle chassis, as shown in Fig. 1, for receiving bolts or other suitable fastening devices therethrough connecting the block with said member. In this connection it should be observed that the bearing block or bracket of the present invention is designed to supplant the steering post bracket now employed upon the Ford type of vehicle, the present invention being particularly designed for use upon this type of vehicle. However, as will appear as the description proceeds, my improved steering gear may also be employed upon other types of vehicles and I do not, therefore, wish to be limited in this regard.

Journaled through the block body is the lower end portion of the usual spark rod 14 now employed upon the Ford type of vehicle. At its lower end, this rod carries a crank 15 to which is connected a link 16 extending to the commutator of the vehicle engine in the well known manner. Journaled at its lower end portion in the outer end of the arm 11 of the block is the usual throttle rod 17 and journaled through this arm at a point substantially midway between the rods 14 and 17 is the steering post 18. Keyed or otherwise secured as indicated at 18' at one end to the lower end of the steering post is a preferably square threaded screw 19 the opposite end of which is, as particularly shown in Fig. 5, journaled in the arm 12 of the block. The rear end portion of the screw 19 is provided with an enlarged head 19' which receives the forward end of the steering post and is in contact with one longitudinal side of the arm 11. Mounted upon the screw to coact therewith is a nut or cross head 20 provided at one end, as particularly shown in Fig. 3, with a laterally directed reduced lug 21 slidably engaging in a suitable slot 22 formed in the inner face of the body of the block and extending longitudinally thereof in a plane with the screw. Thus, when the steering post 18 is turned to rotate the screw 19, the lug 21 will coact with the block to prevent rotation of the nut so that the nut will consequently be shifted longitudinally upon the screw. Extending from the outer end of the nut is a reduced lug or ear 23 and preferably threaded into the upper side of the nut is a grease cup 24 which may be of any approved type.

The arm 12 of the body block is somewhat shorter than the arm 11 and is composed of laterally and forwardly directed mating bearing plates 25 and 26 having their opposed sides provided with semi-circular recesses 26' thereby forming a bearing opening for the reception of the forward end portion of the screw 19. The former plate is integral with the bearing block and the plate 26 is secured to the plate 25 by bolts or other suitable fastening devices 25'. Journaled between the bearing plates at substantially right angles to the screw is a rocker shaft 27. As particularly shown in Fig. 4, this shaft is provided adjacent its upper end with a head or collar supporting the shaft against downward movement and is formed with an upper flattened terminal 28. Fitting over this terminal of the shaft is a crank 29 and extending between the outer end of this crank and the ear 23 of the nut 20 is a link 30 provided at its inner end, as particularly shown in Fig. 3, with a laterally directed portion resting upon the ear and supporting the link in a plane with the crank. Thus, it will be seen that movement of the nut 20 longitudinally upon the screw 19 will result in oscillation of the rocker shaft 27. Keyed or otherwise secured to the lower end of the rocker shaft is a crank arm 31 connected at its lower end by the usual ball and socket joint with the adjacent end of a connecting rod 32 coupling the steering gear with the front wheels of the vehicle in the well known manner.

As will now be readily understood in view of the preceding description, the steering post 18 may be turned in the usual manner for rotating the screw 19 when the nut 20 will be shifted longitudinally of the screw for rocking the shaft 27 and accordingly swinging the crank arm 31 for guiding the vehicle. At the same time, oscillation of the shaft 27 by thrust upon the connecting rod 32 will be prevented by the nut 20. Accordingly, the front wheels of the vehicle will be firmly held against undesirable side turning or wabbling. My improved steering gear will thus operate to effect the steady guiding of the vehicle while the gear will, nevertheless, readily respond to control of the steering post. Furthermore, it is to be observed that the gear is of such nature that it may be readily installed upon vehicles of the Ford type with very little incident structural change therein.

Having thus described the invention, what is claimed as new is:

1. A steering gear including a bearing block having spaced arms, a screw journaled between said arms, one of the arms being formed with mating bearing plates, a rocker shaft journaled between said mating plates, a steering crank carried by said shaft, a nut carried by the screw and slidably engaged with the block whereby the nut will be reciprocated by rotation of the screw, and an operative connection between the nut and shaft whereby the shaft will be oscillated by the nut.

2. A steering gear including a block having a pair of spaced arms, one of said arms comprising a pair of coacting sections having their opposed sides provided with longitudinally extending semi-circular recesses thereby forming a bearing opening, a screw having its forward end mounted in said bearing opening and its opposite end in contact with the other arm, and a nut mounted on said screw and in sliding contact with said block.

3. A steering gear including a block having a pair of spaced arms, one of said arms comprising a pair of coacting sections having their opposed sides provided with semi-circular longitudinally extending recesses opening out through their rear ends thereby forming a longitudinal bearing opening, means to detachably connect said sections, a screw having its forward end arranged in said longitudinal bearing opening and its opposite end in contact with the other arm, a nut mounted on said screw and having sliding contact with said block, said sections being provided with transversely extending semi-circular recesses in their opposed sides thereby forming a transverse bearing opening, a rock shaft extending through said transverse bearing opening, and a link connecting said nut and said rock shaft.

4. A steering gear including an elongated block having an offset longitudinally extending arm at one end and a transversely extending arm at the other end, said longitudinal arm comprising a pair of coacting sections having their opposed sides provided with longitudinally extending semi-circular recesses opening out through their rear ends thereby forming a bearing opening, a screw having its forward end portion mounted in said bearing opening and having its rear portion in contact with said transverse arm, an operating device extending through said transverse arm and connected to the rear end of said screw, a nut mounted on said screw, a rock shaft carried by said longitudinal arm, and a link connecting said rock shaft and said nut.

In testimony whereof I affix my signature.

JOSEPH L. HOFER. [L. S.]